(12) United States Patent
Jur et al.

(10) Patent No.: US 8,697,993 B2
(45) Date of Patent: Apr. 15, 2014

(54) HINGED BUSWAY

(75) Inventors: Arthur James Jur, Greenwood, SC (US); Phillip David Miller, Greenwood, SC (US); Douglas Von Taylor, Greenwood, SC (US); David Ladd Kelley, Greenwood, SC (US); John Michael Kokenda, Greenwood, SC (US)

(73) Assignee: Eaton Corporation, Cleveland, OH (US)

( * ) Notice: Subject to any disclaimer, the term of this patent is extended or adjusted under 35 U.S.C. 154(b) by 344 days.

(21) Appl. No.: 12/802,023

(22) Filed: May 26, 2010

(65) Prior Publication Data

US 2011/0290558 A1 Dec. 1, 2011

(51) Int. Cl.
*H02G 3/04* (2006.01)
*H02G 5/00* (2006.01)
*H02B 1/20* (2006.01)

(52) U.S. Cl.
USPC ......... 174/68.3; 174/68.2; 174/99 B; 361/611

(58) Field of Classification Search
USPC ......... 174/68.2, 71 B, 72 B, 88 B, 99 B, 101, 174/68.3; 361/611; 439/114, 212, 213
See application file for complete search history.

(56) References Cited

U.S. PATENT DOCUMENTS

| | | | | |
|---|---|---|---|---|
| 3,609,215 A * | 9/1971 | Giger et al. | ................. | 174/88 B |
| 4,179,174 A * | 12/1979 | Jorgensen | ..................... | 439/213 |
| 4,423,284 A * | 12/1983 | Kaplan | ........................ | 174/101 |
| 4,673,229 A * | 6/1987 | Jorgensen et al. | ............ | 439/207 |
| 4,714,431 A * | 12/1987 | McGoldrick et al. | ......... | 439/212 |
| 4,886,940 A * | 12/1989 | Gagnon et al. | ............... | 174/88 B |
| 5,024,614 A * | 6/1991 | Dola et al. | ..................... | 439/114 |
| 5,151,043 A * | 9/1992 | Morgan | ........................ | 439/212 |
| 5,192,217 A * | 3/1993 | Wittmer | ........................ | 439/211 |
| 5,235,136 A * | 8/1993 | Santucci et al. | ............. | 174/68.3 |
| 5,261,830 A * | 11/1993 | Jego et al. | ..................... | 439/210 |
| 5,415,557 A * | 5/1995 | Chapman et al. | ............. | 439/142 |
| 5,466,889 A * | 11/1995 | Faulkner et al. | ............. | 174/68.2 |
| 5,728,976 A * | 3/1998 | Santucci et al. | ............. | 174/135 |
| 5,760,339 A | 6/1998 | Faulkner et al. | | |
| 5,895,279 A * | 4/1999 | Petrisko et al. | ............... | 439/114 |
| 6,265,666 B1 * | 7/2001 | Faulkner | ..................... | 174/99 B |
| 6,329,598 B1 | 12/2001 | M'Sadoques et al. | | |
| 6,333,461 B1 * | 12/2001 | Marcou et al. | ............... | 174/68.3 |
| 6,380,484 B1 * | 4/2002 | Theis et al. | .................. | 174/68.3 |
| 6,399,882 B1 | 6/2002 | Faulkner et al. | | |
| 6,435,888 B1 * | 8/2002 | Reed, Jr. | ........................ | 439/213 |
| 6,437,244 B1 * | 8/2002 | Vander Velde | ............... | 174/68.3 |
| 2001/0028547 A1 * | 10/2001 | Wagener | ........................ | 361/611 |

OTHER PUBLICATIONS

Eaton Corporation Electrical Group, "Low Voltage Busway Pow-R-Way III", Instruction Booklet, IB01701001E, Jun. 2009, pp. 1-16.
Eaton Corporation, "Pow-R-Way III Low Voltage Busway", Publication No. BRO1701001E/Z4444, published Jul. 2006, p. 8.
Eaton Corporation, "Pow-R-Way III Low Voltage Busway", Publication No. BRO1701001E/Z4444, published Jul. 2006, pp. 4-5.

* cited by examiner

*Primary Examiner* — Timothy Thompson
*Assistant Examiner* — Sherman Ng
(74) *Attorney, Agent, or Firm* — Eckert Seamans Cherin & Mellott, LLC; Kirk D. Houser

(57) ABSTRACT

A busway section with an electrically conductive housing is described. The busway section includes a lid connected with the housing through a hinging mechanism. Internal slots are also present, along which bus bars can be located. Possible applications of the busway section are feeder sections and plug-in sections.

24 Claims, 8 Drawing Sheets

![US 8,697,993 B2]

HINGED BUSWAY

BACKGROUND

1. Field

The present disclosure relates to busways. More in particular, it relates to a hinged busway.

2. Description of Related Art

The Underwriters Laboratories Inc. standard UL 857 for safety busways defines busway as "a grounded metal enclosure containing factory mounted conductors that are usually copper or aluminum bars, rods, or tubes." The National Electric Code (NFPA 70) defines busway as "a grounded metal enclosure containing factor mounted, bare, or insulated conductors, which are usually copper or aluminum bars, rods, or tubes."

Busway housings are required by standard to be metallic. The housings contain both the busway conductors, insulation between the conductors, and the bus bar supports. The housings may also act as part or whole of the support for the bus bars. Since the housing provides support for the bus bars, the housing should have sufficient strength to withstand forces incurred when the busway section incurs a fault.

Standard busway housings are made from more than one formed metal sections. The sections are normally secured together with bolts or rivets. The method of securing sections takes time to assemble. Hardware should also be spaced along the busway. Additional hardware would provide more support for the bus bars, but would add additional cost to the busway system.

SUMMARY

According to an aspect of the present disclosure, a busway section is provided, comprising: an electrically conductive housing; at least one lid removably connected with the housing through a hinging mechanism, the hinging mechanism including a lid component and a mating housing component; a plurality of internal slots along which bus bars are adapted to be located during an operating condition of the busway section, the slots being enclosed by the housing; and bus supports located between the internal slots, to support the bus bars during the operating condition of the busway section and provide electrical isolation between the bus bars.

Further aspects of the disclosure are provided in the specification, drawings and claims of the present application.

DETAILED DESCRIPTION

Embodiments of the present disclosure show hinged busway sections adapted to be used in a busway system or arrangement comprised of one or more busway sections.

Figure 2:
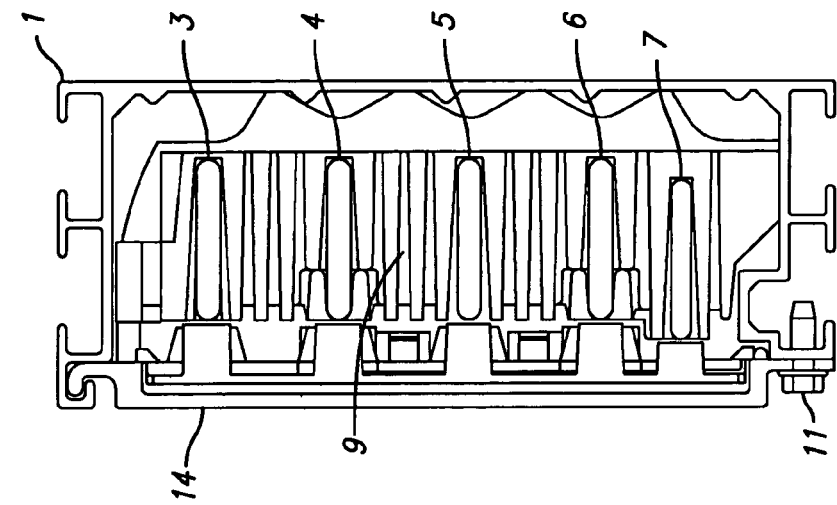
FIG. 2 shows a cross sectional view of a hinged plug-in section with closed lid.
Figure 1:
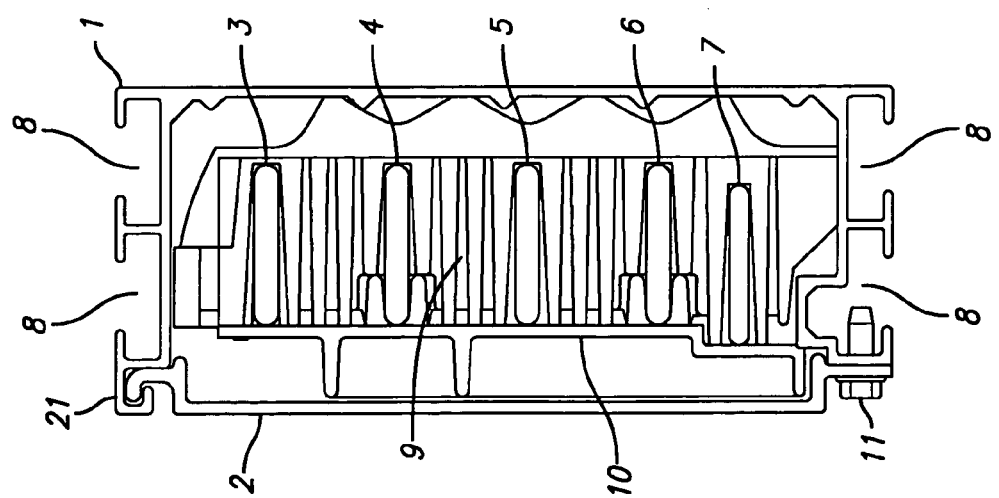
FIG. 1 shows a cross sectional view of a hinged feeder section of a busway with closed lid.

FIGS. 1 and 2 show a feeder section and a plug-in section, respectively, in accordance with an embodiment of the present disclosure. A feeder section allows power to be fed from one location to another by way of power buses running through the section. A plug-in section has the same function of the feeder section but also allows power to be extracted along the length of the section. Each section comprises a housing (1) and at least one lid (2, 14) connected with the housing (1) through a hinging mechanism (21) and a further connection, such as a self tapping screw (11). Each section also comprises a plurality of paths or slots along which bus bars (3-7) can be located during an operating condition of the section. According to an embodiment of the disclosure, the slots are comprised of a rectangular shaped opening in a molded thermoplastic part. The molded thermoplastic part comprises a plurality of slots which, according to some embodiments, can be placed at distances between 0.5 inches and 1.25 inches depending upon requirements imposed by regulatory standards.

The housing (1) is a protective structure that protects the components or parts of the feeder section or plug-in section. When combined with the lid (2, 14), the housing (1) encloses the bus bars (3-7) inside the section. By way of example, the housing (1) can be an aluminum extrusion. The aluminum is conductive and may act as the ground path.

Figure 4:
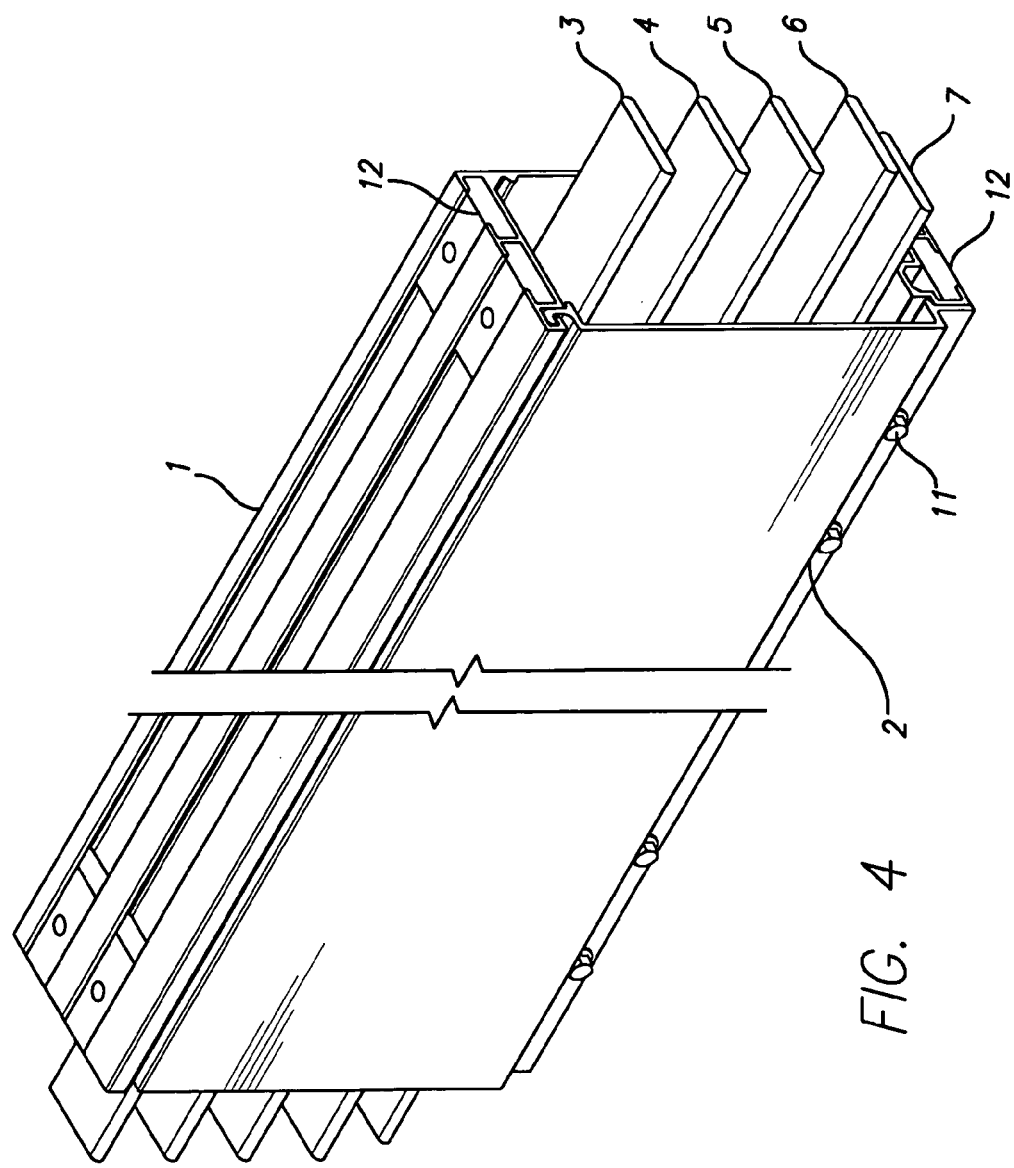
FIG. 4 shows a partial perspective view of the feeder section of FIG. 1.
Figure 5:
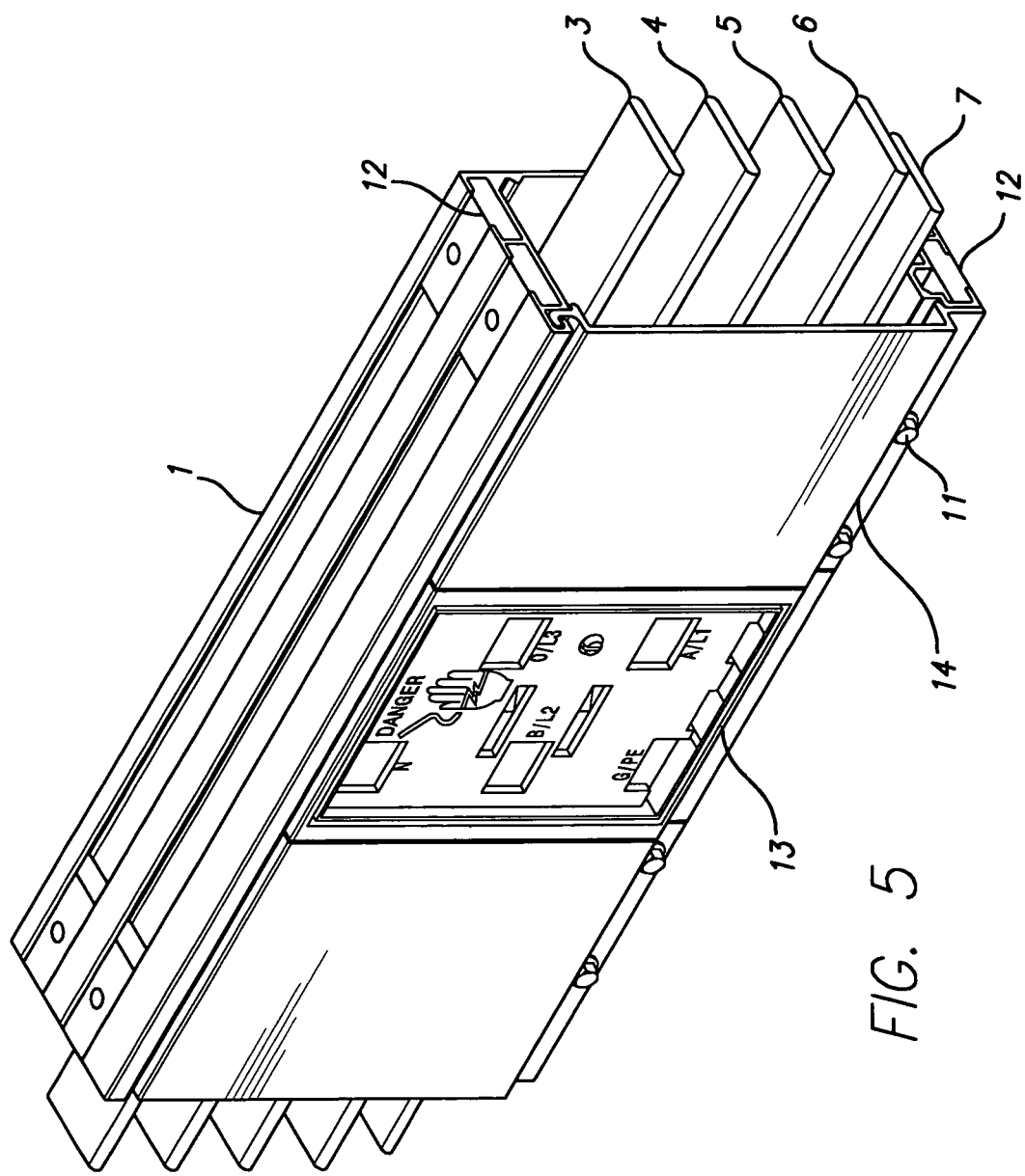
FIG. 5 shows a partial perspective view of the plug-in section of FIG. 2.

The lid (2, 14) is a hinged cover that can be removed or raised. In a feeder section only one feeder lid (2) can be provided, as shown in FIG. 4. In a plug-in section, where a plug-in block or brick (13) is included, two plug-in lids (14) on the sides of the plug-in block (13) can be provided, as shown in FIG. 5.

Turning to the description of FIGS. 1 and 2, a plurality of bus bars (3-7) are located inside each section during operation inside respective paths or slots provided for in such sections, as mentioned above. In the embodiment shown in FIGS. 1 and 2, five different bus bars are shown. In particular, one neutral conductor bar (3), a plurality of phase conductor bars (4-6) and one ground conductor bar (7) are shown. A neutral conductor is a circuit conductor that carries current which is connected to ground generally at the service panel with the main disconnecting switch or breaker. A phase conductor method is a method of electric power transmission using wires or bus(es). In accordance with the present disclosure, bus bars are used. A ground conductor is an electrical connection intended to carry current safely away from a circuit in the event of a fault. By way of example, as shown by element (7), such ground conductor can be a bus bar. Alternatively, the housing (1) can act as the ground path. The person skilled in the art will understand that any number of bus bars can be provided, according to the requirements of the particular applications. The bus bars may vary in size depending on the amount of current needed.

According to some embodiments of the disclosure, the housing (1) is provided with slots (8) for placing T-nuts used for mounting, as shown in FIGS. 1 and 2. Mounting can be required in order to hang the busway from the roof of ceiling structures of a building. See also FIGS. 5 and 6, which will be later discussed in detail.

The internal slots adapted to contain the bus bars (3-7) are separated by bus supports (9). The bus supports (9) are molded parts used to support the neutral, phase and ground conductors during operation of the busway sections. The bus supports (9) are spaced along the length of the busway to both separate the bars (3-7) for isolation purposes and hold the bars (3-7) together when a short circuit pushes the bars (3-7) apart. According to an embodiment of the present disclosure, the bus supports (9) are made of a molded thermoplastic material, which may flex under pressure. The bus bars (3-7) are pressed into the slots in the supports. The supports are so tolerance that the bars do not slip from their locations in the slots.

Figure 3:
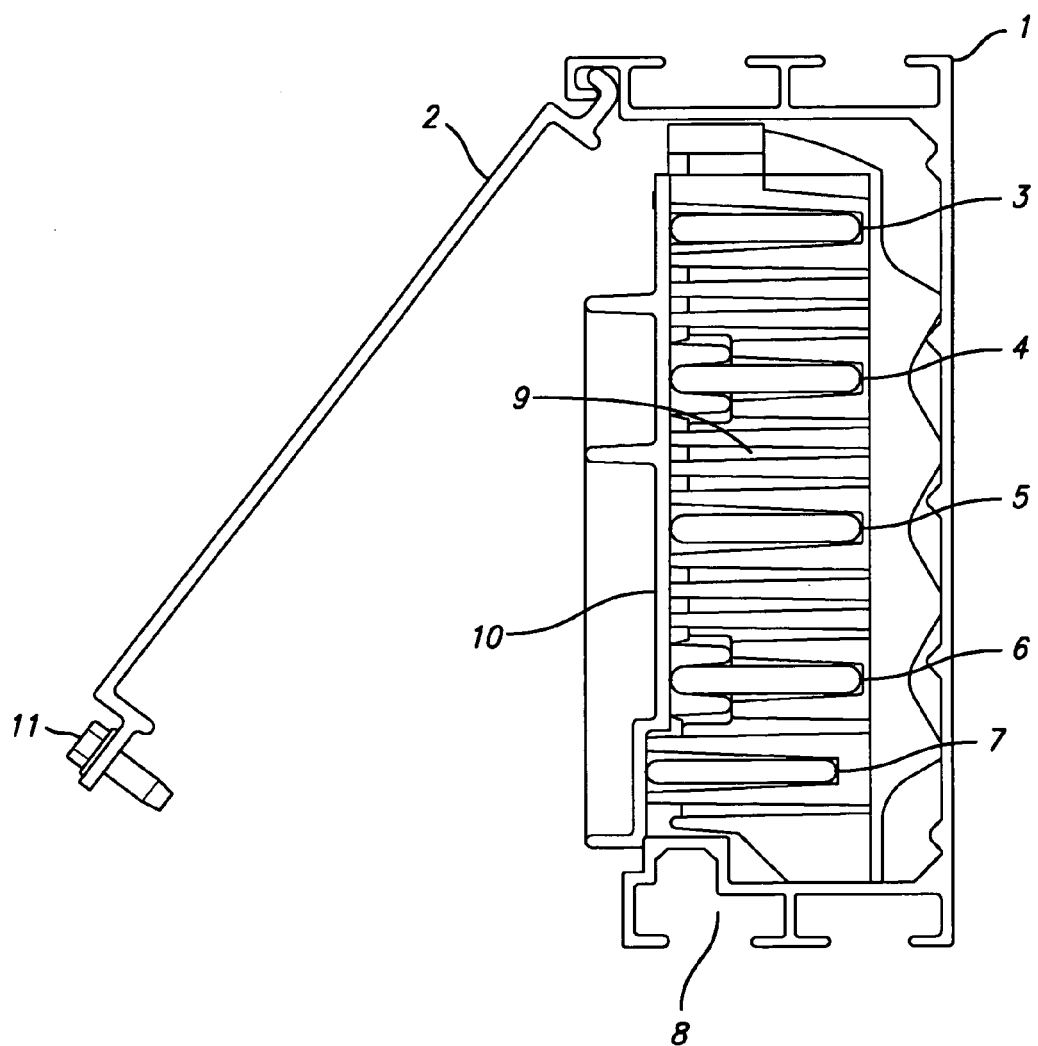
FIG. 3 shows a cross sectional view of the feeder section of FIG. 1 with the lid in a raised condition.

The feeder section of FIG. 1 also comprises a feeder support (10), also shown in FIG. 3. The feeder support (10) is a lid or cover that fits within the lid (2) and goes on the side of the bus supports (9) to help hold the bus bars (3-7) in place. In particular, the feeder support (10) can be a molded thermoplastic part that is shaped to touch each installed bus bar (3-7) and the lid (2). When installed, the feeder support (10) keeps the bus bars (3-7) from slipping out of their slots. On the other hand, in the plug-in section of FIG. 2, the bus bars (3-7) are held in place just by a plug-in brick (13), better shown in FIG. 5. In particular, the plug-in brick (13) is configured so that it also touches the bus bars (3-7) and the short sections of lid (14).

FIGS. 1 and 2 also show screws (11), e.g. hexagonal head self tapping screws (11), which are used to secure the lid (2) to the housing (1) after assembly. The self-tapping screws (11) eliminate the need for nuts and bolts, since the threads of the screws (11) form threads in the lip of the housing (2) and lock the lid (2) to the housing (1). In accordance with several embodiments of the present disclosure, the screws (11) are located only on one side of the housing (1) (the bottom in FIGS. 1, 4 and 5) in view of the presence of hinging mechanism (21), which includes a lid component and a mating housing component.

FIGS. 4-7 show end blocks (12) located at the top and bottom of a feeder section (e.g., FIG. 4) or plug-in section (e.g., FIG. 5) inside respective external slots (8), already discussed above. According to several embodiments of the disclosure, the end blocks (12) are T-shaped nuts that fit into the end of a corresponding T-slot (8) and are used for connecting the feeder section or plug-in section to a bridge joint (17), as shown, for example, in FIG. 6. The end blocks (12) provide a conductive path from the busway housing (1) of a feeder section or plug-in section to covers (15, 16) of the bridge joint (17). According to an embodiment of the disclosure, a threaded hole (120) is provided in the center of each end block (12) to provide a location for hardware (e.g., a threaded screw) to fasten the covers (15, 16) to the end block (12). The T-shape of the end block (12) allows locking the end block (12) into the housing (1) as the hardware holding the cover (15, 16) to the end block (12) is tightened.

As already mentioned above, the plug-in sections of the busway include a plug-in block or brick (13). According to several embodiments of the disclosure, a plug-in block (13), as shown in FIG. 5, is an assembly of insulating molded plastic parts that provide a point for power to be accessed from the busway section. Any space to the side of a plug-in block (13) is covered by plug-in lids (14) as shown, for example, in FIG. 5.

Figure 9:
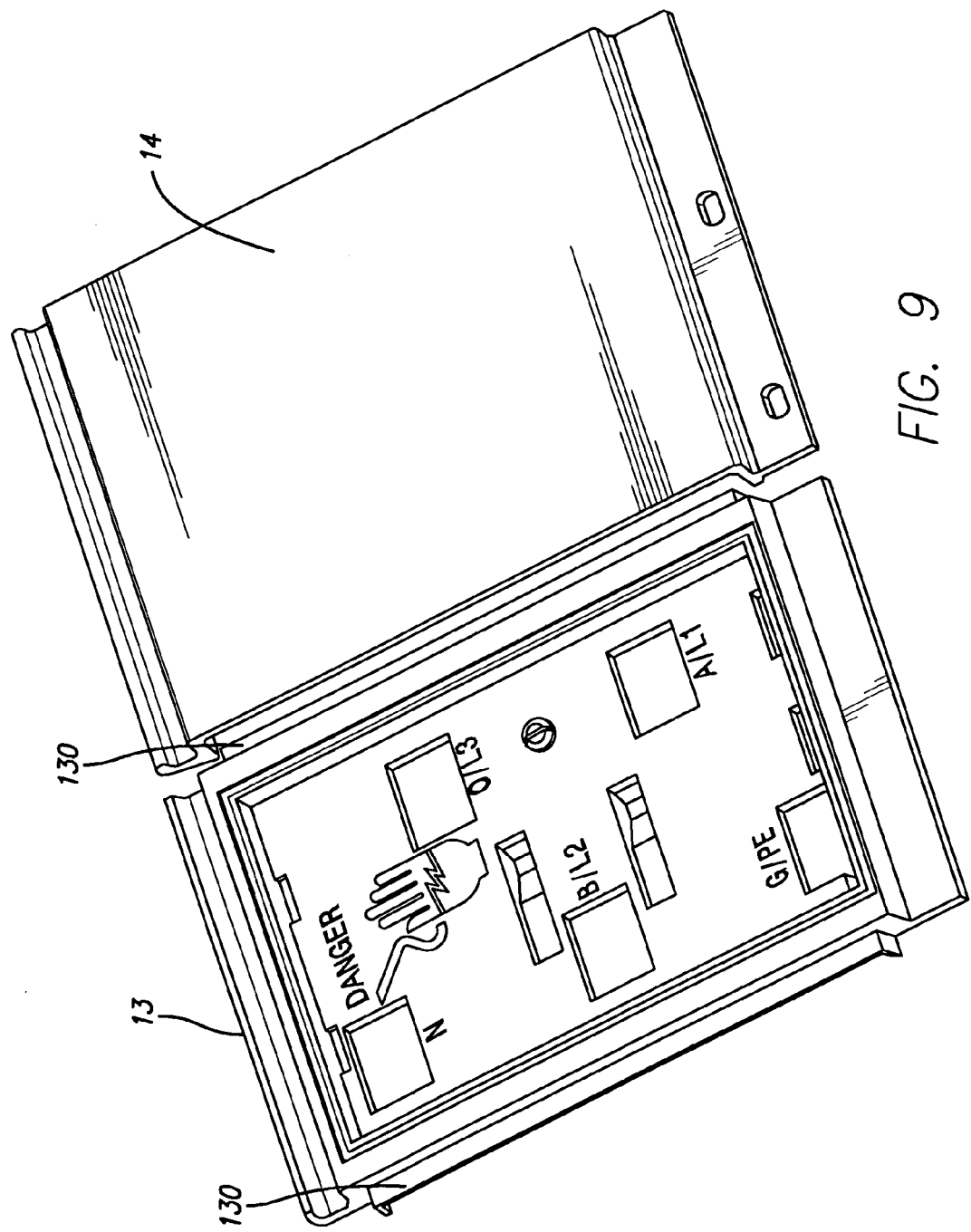
FIG. 9 shows a perspective view of a plug-in brick and lid, already shown in FIG. 5 and FIG. 7, placed side by side.

As shown in FIG. 2, the plug-in bricks (13) hinge on one side to the housing (1). As also shown in FIG. 9, a lip (130) is molded into two sides of the plug-in brick and is shaped to fit underneath the plug-in lids (14). Therefore, when the plug-in lids (14) are fixed to the housing (1) the plug-in bricks (13) are also secured to the housing (1).

As already mentioned above, a plug-in section includes plug-in lids (14), as shown in FIG. 5. The plug-in lids (14) are cut to length to fit between the plug-in brick (13). The plug-in lids (14) hinge on one side (the upper in FIG. 5) to the housing (1). The side opposite the hinge can be fastened to the housing (1) with self-tapping screws, as shown, for example, in FIGS. 2 and 5.

Figure 6:
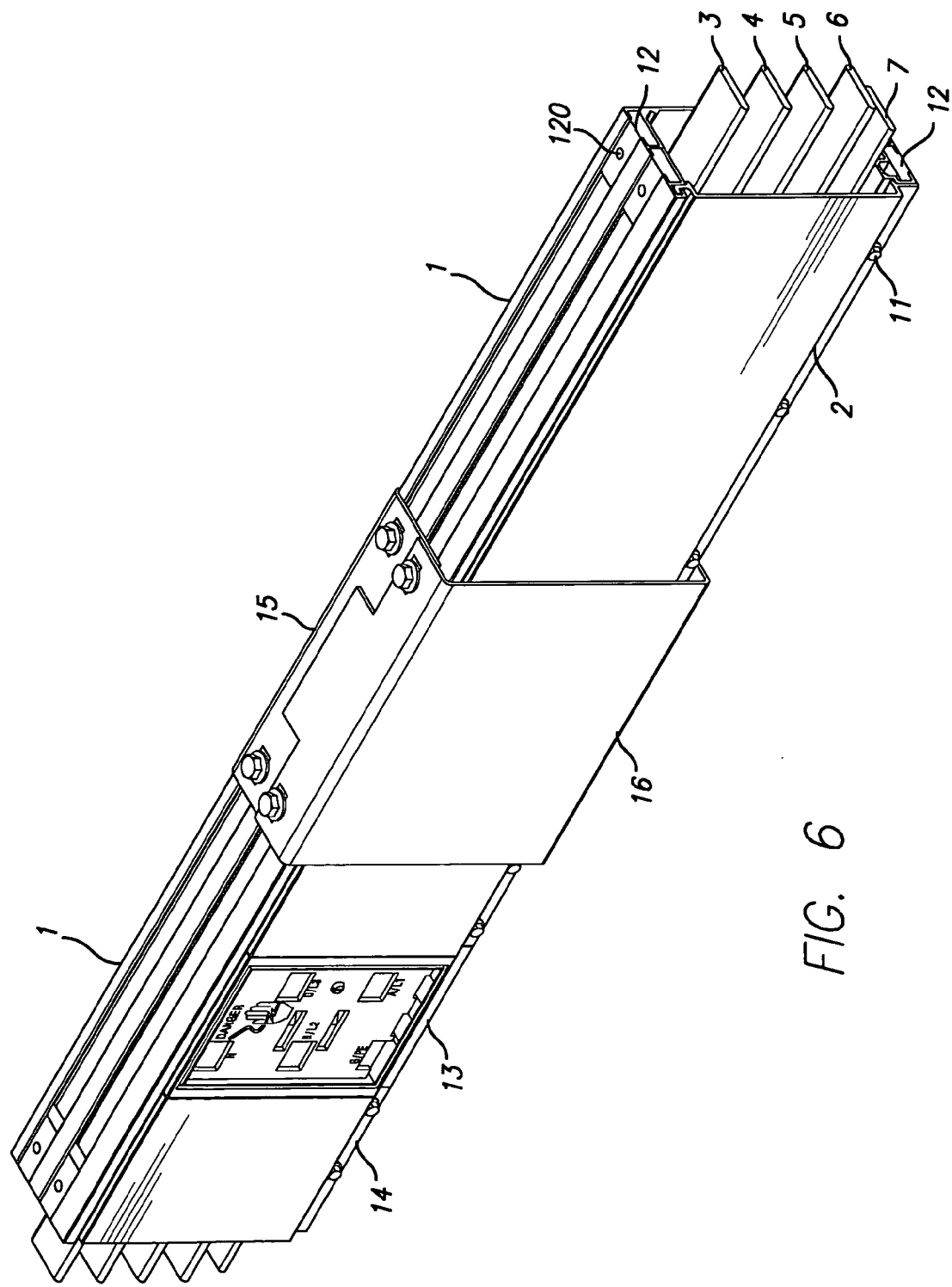
FIG. 6 shows a partial perspective view of an arrangement comprising a plug-in section and a feeder section joined by a bridge joint.
Figure 7:
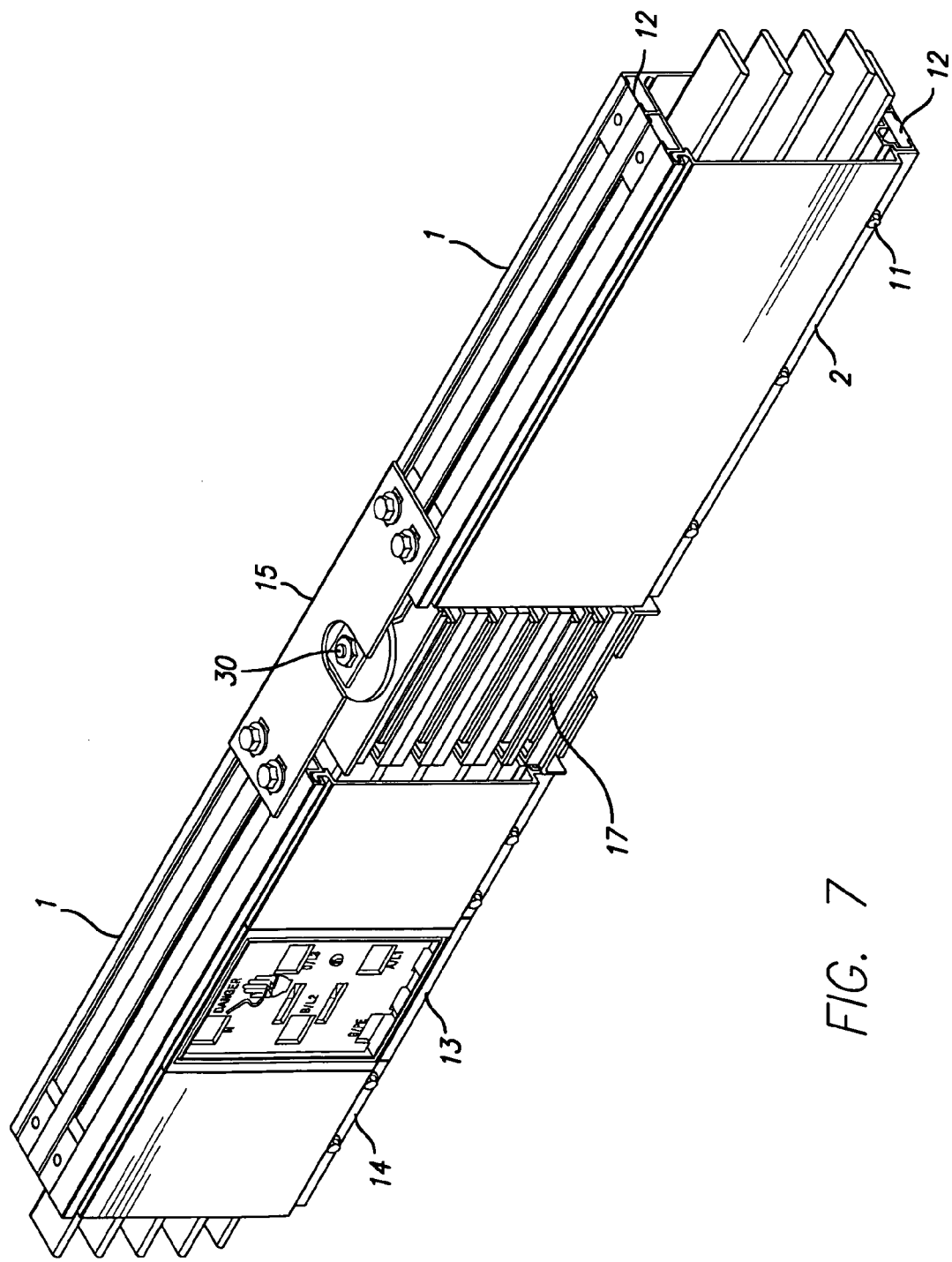
FIGS. 7 and 8 show a perspective view and a front view of the arrangement of FIG. 6, where the cover of the bridge joint has been removed to show the inside of the bridge joint.
Figure 8:
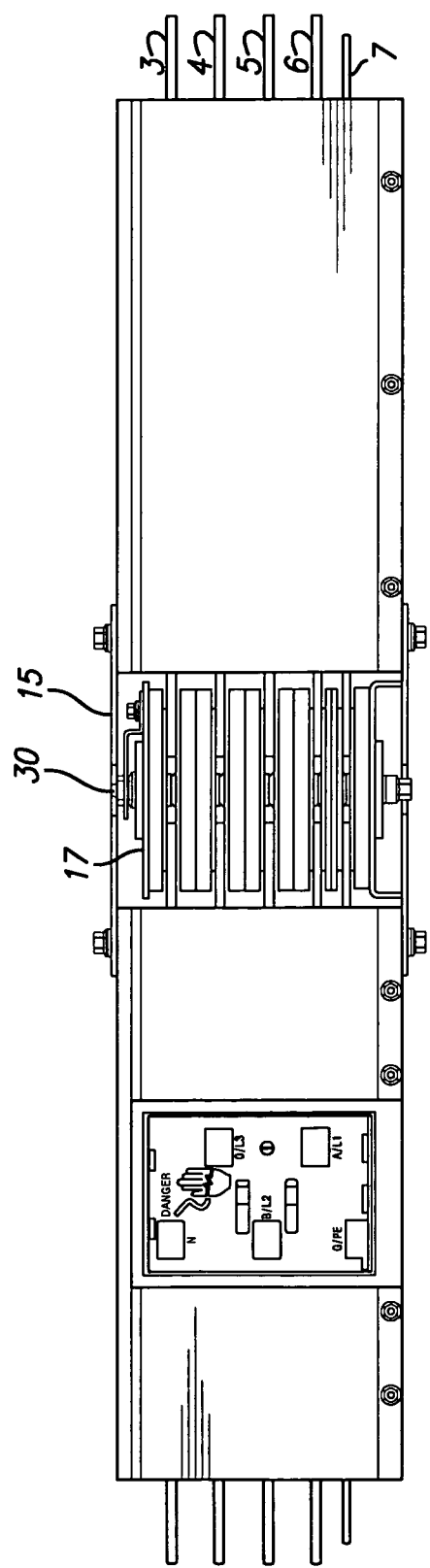

FIGS. 6-8 show embodiments of the present disclosure where a bridge joint (17) is present. The bridge (17) allows bridging of two busway sections, e.g. a plug-in section and a feeder section, as shown in such figures. As shown in the cross-sectional view of FIGS. 7 and 8, the bridge joint (17) is made from alternating combinations of insulators and conductors. The bridge joint (17) will not be described in detail in the present application. Reference can be made, for example, to U.S. Pat. No. 5,760,339, incorporated herein by reference in its entirety. In the embodiment of FIGS. 7 and 8, a bolt (30) runs through the center of the bridge joint (17). FIG. 6 shows bridge joint back (15) and front (16) covers to cover the back and the front of the bridge joint, respectively. These covers can be made of aluminum and provide an electrical ground path from one busway housing section to the next.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

The examples set forth above are provided to give those of ordinary skill in the art a complete disclosure and description of how to make and use the embodiments of the hinged busway housing of the disclosure, and are not intended to limit the scope of what the inventors regard as their disclosure. Modifications of the above-described modes for carrying out the disclosure may be used by persons of skill in the video art, and are intended to be within the scope of the following claims.

A number of embodiments of the disclosure have been described. Nevertheless, it will be understood that various modifications may be made without departing from the spirit and scope of the present disclosure. Accordingly, other embodiments are within the scope of the following claims.

The invention claimed is:

1. A busway section comprising
an electrically conductive housing;
at least one lid removably connected with the housing through a hinging mechanism extending along an entire length of the lid, the hinging mechanism including a lid component of the lid and a mating housing component of the housing, the lid component of the hinging mechanism and the mating housing component of the hinging mechanism extending along the entire length of the lid, the lid component of the hinging mechanism being both slidable and hinged with respect to the mating housing component of the hinging mechanism;
a plurality of internal slots along which bus bars are adapted to be located during an operating condition of the busway section, the slots being enclosed by the housing;

bus supports located between the internal slots, to support the bus bars during the operating condition of the busway section and provide electrical isolation between the bus bars; and said busway section being a plug-in section, further comprising a plug-in block, said plug-in block comprising two lips located on two sides of the plug-in block, each of the two lips being structured to match with and fit underneath a corresponding lid of said at least one lid when said corresponding lid is fixed to said housing, thereby securing the plug-in block to said housing.

2. The busway section of claim 1, further comprising a connecting element to further connect the housing with the at least one lid.

3. The busway section of claim 2, wherein the connecting element is a self tapping screw.

4. The busway section of claim 2, wherein the connecting element is located on a same side of the hinging mechanism with respect to the housing.

5. The busway section of claim 1, wherein the conductive housing is made of aluminum.

6. The busway section of claim 1, wherein the electrically conductive housing acts as a ground path of the busway section.

7. The busway section of claim 1, said busway section being a feeder section.

8. The busway section of claim 7, further comprising:
a feeder support located inside the housing between the lid and the internal slots to hold the bus bars in place during the operating condition of the busway section.

9. The busway section of claim 1, wherein the plurality of slots comprise:
one slot for a neutral conductor bus bar; and
a plurality of slots for phase conductor bars.

10. The busway section of claim 9, further comprising a slot for a ground conductor bar.

11. The busway section of claim 1, wherein the housing comprises external slots.

12. The busway section of claim 11, wherein the external slots are located on a top external surface and a bottom external surface of the housing.

13. The busway section of claim 11, further comprising connection elements, each of the connection elements located in an end region of a respective external slot.

14. The busway section of claim 13, wherein the connection elements are T-shaped nuts.

15. A busway arrangement comprising a plurality of busway sections according to claim 1.

16. The busway arrangement of claim 15, wherein the busway sections are serially arranged.

17. The busway arrangement of claim 15, wherein the busway sections comprise a feeder section and a plug-in section with a plug-in block, wherein each of the feeder section and plug-in section comprises:
an electrically conductive housing;
at least one lid removably connected with the housing through a hinging mechanism, the hinging mechanism including a lid component and a mating housing component;
a plurality of internal slots along which bus bars are adapted to be located during an operating condition of the busway section, the slots being enclosed by the housing; and
bus supports located between the internal slots, to support the bus bars during the operating condition of the busway section and provide electrical isolation between the bus bars.

18. The busway arrangement of claim 17, further comprising a bridge joint connecting the feeder section with the plug-in section, the bridge joint being located between the feeder section and the plug-in section.

19. The busway arrangement of claim 18, wherein the housing of the feeder section and the housing of the plug-in section comprise external slots accommodating connection elements adapted to connect the feeder section and the plug-in section with the bridge joint.

20. The busway section of claim 1 wherein the lid component of the hinging mechanism includes a J-shaped portion extending along the entire length of the lid; wherein the mating housing component of the hinging mechanism includes a C-shaped portion extending along the entire length of the lid; and wherein the J-shaped portion of the lid component of the hinging mechanism is both slidable and hinged with respect to the C-shaped portion of the mating housing component of the hinging mechanism.

21. The busway section of claim 20 wherein the electrically conductive housing including the mating housing component is an extrusion.

22. A busway section comprising
an electrically conductive housing including a first hinging mechanism;
at least one lid including a second hinging mechanism cooperating with the first hinging mechanism, the lid being removably connected with the housing through the first and second hinging mechanisms both of which extend along an entire length of the lid, the second hinging mechanism being both slidable and hinged with respect to the first hinging mechanism;
a plurality of internal slots along which bus bars are adapted to be located during an operating condition of the busway section, the slots being enclosed by the housing;
bus supports located between the internal slots, to support the bus bars during the operating condition of the busway section and provide electrical isolation between the bus bars; and
said busway section being a plug-in section, further comprising a plug-in block, said plug-in block comprising two lips located on two sides of the plug-in block, each of the two lips being structured to match with and fit underneath a corresponding lid of said at least one lid when said corresponding lid is fixed to said housing, thereby securing the plug-in block to said housing.

23. The busway section of claim 22 wherein the second hinging mechanism includes a J-shaped portion extending along the entire length of the lid; wherein the first hinging mechanism includes a C-shaped portion extending along the entire length of the lid; and wherein the J-shaped portion of the second hinging mechanism is both slidable and hinged with respect to the C-shaped portion of the first hinging mechanism.

24. The busway section of claim 23 wherein the electrically conductive housing including the first hinging mechanism is an extrusion.

* * * * *